UNITED STATES PATENT OFFICE.

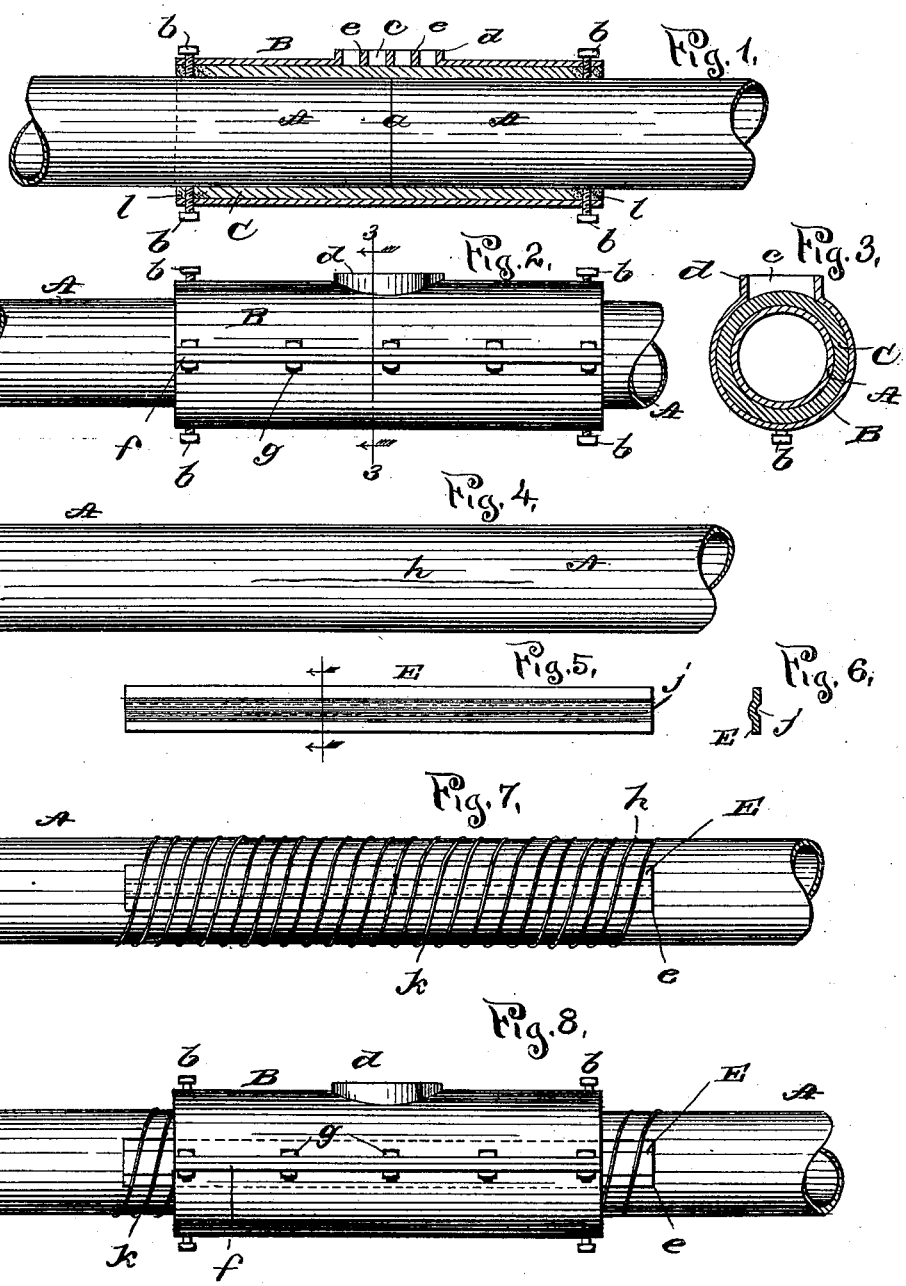

JACOB S. SMITH, OF CHICAGO, ILLINOIS.

METHOD OF STOPPING LEAKS AND STRENGTHENING PIPES.

SPECIFICATION forming part of Letters Patent No. 647,996, dated April 24, 1900.

Application filed November 6, 1899. Serial No. 735,910. (No model.)

*To all whom it may concern:*

Be it known that I, JACOB S. SMITH, a citizen of the United States, residing at Chicago, in the county of Cook and State of Illinois, have invented certain new and useful improvements in methods of arresting leakage and strengthening pipes, cylinders, and other receptacles carrying or containing liquid or gases, of which the following is a full, clear, and exact specification.

This invention relates generally to the repairing of leaking pipes, cylinders, and other conduits or receptacles whether from faulty casting or cracks produced therein from undue pressure, freezing, or any other cause and also to strengthening pipes having weak spots therein liable to leak from some cause or other and due to faulty casting and also to the closing of joints between the ends of pipes; but this invention relates more specifically to the repairing of leaks in pipes, cylinders, and other conduits and vessels employed for conducting and holding gases and liquids under pressure and during the existence of such pressure.

The prime object of this invention is to repair a pipe or other conduit or receptacle while under pressure from liquids and gases and without reducing such pressure or interfering with their onward flow.

A further object is to provide methods by which during a substantial portion of the repair the leakage or gas may be confined within such limits that it may be finally and entirely closed without reducing the flow of liquids and gases, and this particularly when the pipe is under very high pressure from said liquids and gases.

A still further object is a method by which the area of the strain produced upon a pipe by a leak therein whether at a crack or joint may be gradually reduced and finally centered at the leak in such a manner that the weakest point in the pipe—namely, at the leak—45 may be strengthened beyond any possibility of again springing a leak at the same point and in such a manner that the pressure upon the outside of the pipe will equal that upon the inside of the pipe however great said pressure may be.

A still further object is a method by which defective pipes either before or while under pressure may be strengthened in such a manner that the subsequent or existing outside pressure will equalize the strain of the inside pressure upon the pipes from the gases or liquids under pressure therein, and this by the same method employed for arresting and repairing leakage in the pipes while under pressure.

Another object is the method by which the before-named leakages in pipes may be repaired, their joints rendered tight, and their weak points strengthened when from their contents or atmospheric conditions their temperature is so low that such a repair could not be otherwise made.

With these ends in view my invention consists in certain features of novelty in the steps and combination of steps by which the said objects and certain other objects hereinafter appearing are attained and fully described with reference to the accompanying drawings, showing differing construction of devices for performing these methods, and more particularly pointed out in the claims.

In the said drawings, Figure 1 illustrates a longitudinal section of a coupling for a pipe-joint disclosing the means by which my method is applied to such a joint, the pipe-sections being shown in full lines. Fig. 2 is a side elevation of the devices employed under my method for arresting a leak in a pipe-section at a point between its joints and in which a sectional hard-metal cylinder may be employed as illustrated in this figure. Fig. 3 is a transverse section of Fig. 2 on the line 3 3. Fig. 4 is a side elevation of a pipe, illustrating a leakage due to a crack therein. Fig. 5 is a plan view of one of several forms of the capping-plate employed in one of the steps of my method. Fig. 6 is a transverse section of the same. Fig. 7 is a top plan view of a pipe, showing the capping-plate in position and the wire or other wrapping employed for maintaining it in position while performing my method to close the joint; and Fig. 8 is a top plan view of a pipe having the capping-plate and hard-metal cylinder surrounding the same and the pipe in their operative position for performing my method for repairing the leakage in the body of the pipe while under pressure of the liquid or gaseous contents thereof.

Referring to Fig. 1, in which the joints of two pipes A are shown at $a$, B indicates a hard-metal cylinder, of greater diameter than the pipes A, surrounding said pipes, with the joints $a$ about midway its length, the hard-metal cylinder being centered thereon by screws $b$ passing therethrough and abutting against the pipes A, said screws being used in such numbers as will properly center the hard-metal cylinder B on said pipes. At one side, and in practice the top side, of the hard-metal cylinder B are a number of openings $c$ therethrough, communicating with the annular chamber between the cylinder B and the pipes A, which are shown as formed by a circular flange $d$ (see Fig. 3) and cross-bars $e$ for the purposes of forming a receptacle for the soft metal hereinafter referred to poured into said annular chamber; but it will be no departure from my invention to dispense with said flange and cross-bar and perforate or slot the body of the cylinder itself for that purpose.

C indicates a soft-metal cylinder between the hard-metal cylinder B and the pipes A, which extends the length of the hard-metal cylinder, and therefore over and about equidistant from each side of the joints $a$.

In carrying out the method of closing the joint, as indicated in Fig. 1, the pipe-sections A are slipped into the hard-metal cylinder B until the joint $a$ is about midway thereof. The centering-screws $b$ are then adjusted until the cylinder B is centered on the pipes A, and when this is done the open ends of the hard-metal cylinder are closed by banking up clay or other suitable material around the pipe-sections, after which the soft metal is poured through the openings $c$ until the annular stops between the hard-metal cylinder and the pipes and also the openings C are entirely filled. As soon as the soft-metal cylinder has become sufficiently hard the clay is removed and the ends of the soft-metal cylinder are tamped firmly by any suitable means; but before this is done the centering-screws B may be used for centering the hard-metal cylinder at some other point on the same or some other pipes.

If the temperature of the pipe-sections A from climatic or any other cause is cold enough to prevent a tight joint between the soft-metal and the hard-metal cylinder or to chill the soft metal before the joint can be formed, it is a part of my invention in such cases to heat the hard-metal cylinder B and have it in a heated condition until the annular space has been entirely filled to form the soft-metal cylinder surrounding the pipe over the joint, and when the conditions will permit the pipe-sections may also be heated, and one or both of these heatings may be done either before or after the pipe-sections are in their operative condition in a hard-metal cylinder. In this connection it is proper to add that it would be no departure from my invention to coat the inside of the hard-metal cylinder with cobalt, lime, or other "slip," whereby after the soft-metal cylinder is set and the set-screws removed the hard-metal cylinder may be slipped off the soft-metal cylinder and used to form the mold for another soft-metal cylinder at some other point on the pipes; but this should only be done in pipes, &c., wherein the gases or liquids are at a low pressure and when it is known that the soft-metal cylinder has sufficient strength in itself to sustain a weak point in the pipe or resist further leakage at the point where it is located, but as a rule in practice the hard-metal cylinder should be permanent, because then the strength of the pipe at that point is sure to be as strong as at any other point not defective.

For the purposes of repairing or jointing pipes when in a position rendering them inconvenient to use the hard-metal cylinder shown in Fig. 1 I employ for the purposes of carrying out my method a two-part or sectional hard-metal cylinder, as illustrated in Fig. 2, which may be provided with flanges $f$, bolted together by nuts and bolts $g$, or instead thereof I may employ clamping-bands, (not shown,) or, if desired, one side may be hinged by an ordinary hinge-joint (not shown) and the other secured together by any suitable means.

When a pipe is leaking from a crack, as shown at $h$ in Fig. 4, the first step in the process of arresting such leakage is to apply over the crack and lengthwise thereof a capping-plate E, (see Figs. 5 and 6,) which capping-plate is bent, upset, or otherwise provided with a duct, which, for example, is indicated at $j$ in said figures, corresponding with the fissure $h$ in the pipe, (see Fig. 4,) so that when held against the pipe by wiring $k$, as shown in Fig. 7, the further escape of gas will be confined to the duct in the capping-plate and openings at one or both ends thereof, as may be, the capping-plate being of greater length than the crack and preferably of greater length than the hard-metal cylinder, as shown in Fig. 8; but it should be understood that as the cracks or leaking openings in the pipes vary the shape of the capping-plate is correspondingly varied, and hence the face of the crack in Fig. 4 and the capping-plate shown in the several figures of the drawings are merely for the purposes of illustrating the feature of capping the leak in accordance with my invention. Having secured the capping-plate in position, as above indicated, the hard-metal cylinder B is then placed around the pipe and over the capping-plate, as indicated in Fig. 8, and after centering the hard-metal cylinder the soft metal in a molten condition is then run into place, the hard-metal cylinder being heated or not during this time, as occasion may require, for the purposes of making the best possible joint under the conditions of the weather and the temperature of the pipe, due either to internal or external surface. After the soft-metal cylinder has set it is, either with or without removing the centering-screws B, tamped at its ends, as indicated at *l* in Fig. 1, and either before or after so tamping the soft-metal cylinder the end or ends, as may be, of the capping-plate are also tamped until the outlet or outlets thereof are entirely closed, and in some instances when desirable the metal surrounding the openings of the capping-plate is driven in far enough not only to close them, but for sealing them within the hard-metal cylinder by means of soft metal either tamped therein or poured in in a molten state and with or without subsequent tamping.

A capping-plate is an important feature of my invention in the arresting of leakage either at the joints or in the body of a pipe during the pressure of the gas and liquids therein, because confining their escape through the parts, and thereby providing for completely surrounding the pipe with both the hard and soft metal cylinders, and as a result subjecting the outside of the pipe to the same pressure as its inside pressure, and thus equalizing the strain and strengthening the pipe all around the defective point before finally closing the leaking opening therein, and which when closed results in equalizing the inside and outside pressure at this particular point by distributing such pressure throughout the pipe, at least within the confines of the surrounding cylinders.

My invention is manifestly valuable and important for arresting leakage and repairing pipes in gas and water mains, and especially mains for natural gas, usually many miles in length, and in which the gas is and must be constantly maintained at a very high pressure and subjected to constant and continuous use night and day, for it entirely obviates, as I have repeatedly practically demonstrated, the heretofore necessity of reducing the pressure at all, and, worse, practically if not wholly shutting off the gas from all consumers during the repair, to the great injury and loss of both the consumer and the producer.

In conclusion it should be observed that any kind of suitable metal may be used for the hard cylinder and that it would be no departure from my invention to substitute wood, paper, stock, leather, rawhide, rubber, or other tough fiber therefor.

Having thus described my invention, what I claim as new therein, and desire to secure by Letters Patent, is—

1. The herein-described method of arresting leakage from and strengthening defective pipes, cylinders, &c., the same consisting in first placing over the leak or defective portion of the pipe, &c., a metal capping-plate provided with a duct or ducts and one or more outlets for the escaping gas or liquid, then casting a cylinder of soft metal around the pipe, &c., adjacent and over said capping-plate and finally closing the outlets of the latter, substantially as described.

2. The herein-described method of arresting leakage from and strengthening defective pipes, cylinders, &c., the same consisting in first placing over the leak or defective portion of the pipe, &c., a metal capping-plate provided with a duct or ducts and one or more outlets for the escaping gas or liquid, then casting a cylinder of soft metal around the pipe, &c., adjacent and over said capping-plate and finally closing the outlets of the latter, and tamping the ends of said soft-metal cylinder, substantially as described.

3. The herein-described method of arresting leakage from and strengthening defective pipes, cylinders, &c., the same consisting in first placing over the leak or defective portion of the pipe, &c., a metal capping-plate having a duct or ducts provided with one or more outlets for the escape of gas and liquid, then surrounding the pipe, &c., and said capping-plate with a hard cylinder of greater diameter than the pipe, &c., then casting a cylinder of soft metal between said hard-metal cylinder and the pipe, &c., and finally closing the outlets of said capping-plate, substantially as described.

4. The herein-described method of arresting leakage from and strengthening defective pipes, cylinders, &c., the same consisting in first placing over the leak or defective portion of the pipe, &c., a metal capping-plate having a duct or ducts provided with one or more outlets for the escaping gas or liquid then surrounding the pipe, &c., over the capping-plate with a hard cylinder of greater diameter than the pipe, &c., then casting a soft-metal cylinder around the pipe, &c., between the pipe, &c., and the hard-metal cylinder, then tamping the ends of said soft-metal cylinder and finally closing the outlets of the capping-plate, substantially as described.

5. The herein-described method of arresting leakage from and strengthening defective pipes, cylinders, &c., the same consisting in first placing over the leak or defective portion of the pipe, &c., a metal capping-plate having a duct or ducts provided with one or more outlets for the escaping gas and liquids, then surrounding the pipes, &c., with a heated hard-metal cylinder extending over the capping-plate, then casting a soft-metal cylinder between the hard-metal cylinder while in a heated condition and over the capping-plate, tamping the ends of said soft-metal cylinder, and finally closing the outlets of the capping-plate, substantially as described.

6. The herein-described method of arresting leakage from and strengthening defective pipes, cylinders, &c., the same consisting in first placing over the leak or defective portion of the pipe, &c., a metal capping-plate having a duct or ducts provided with one or more outlets for the escaping gas and liquids, then surrounding the pipes, &c., with a heated hard-metal cylinder extending over the capping-plate, then casting a soft-metal cylinder between the hard-metal cylinder while in a heated condition and over the capping-plate, tamping the ends of said soft-metal cylinder and finally closing the outlets of the capping-plate, and then tamping both the ends of the soft-metal cylinder and the outlets of the capping-plate to close and seal the same against a further escape of gas therefrom, substantially as described.

JACOB S. SMITH.

Witnesses:
 EDNA B. JOHNSON,
 JNO. G. ELLIOTT.